J. G. SHEPARD.
COMBINATION STRAINER AND EGG HOLDER.
APPLICATION FILED AUG. 2, 1911.

1,027,079.

Patented May 21, 1912.

WITNESSES
W. F. Kayle
Parker Cook

INVENTOR
Josephine G. Shepard
BY
A. P. Gruey
Attorney

UNITED STATES PATENT OFFICE.

JOSEPHINE G. SHEPARD, OF BROOKLYN, NEW YORK.

COMBINATION STRAINER AND EGG-HOLDER.

1,027,079.  Specification of Letters Patent.  Patented May 21, 1912.

Application filed August 2, 1911. Serial No. 641,981.

*To all whom it may concern:*

Be it known that I, JOSEPHINE G. SHEPARD, a citizen of the United States, residing at Brooklyn, in the county of Kings, State of New York, have invented certain new and useful Improvements in Combination Strainers and Egg-Holders, of which the following is a description, reference being had to the accompanying drawings, forming a part hereof.

My invention relates to an improvement in a combination tea or coffee strainer and egg holder, and has for its object to provide an article of this character that is simple in construction, neat in appearance, and cheap to manufacture.

With these and other objects in view, my invention consists in certain new and novel features of construction which will be hereinafter fully described and pointed out in the claims.

Figure 1:
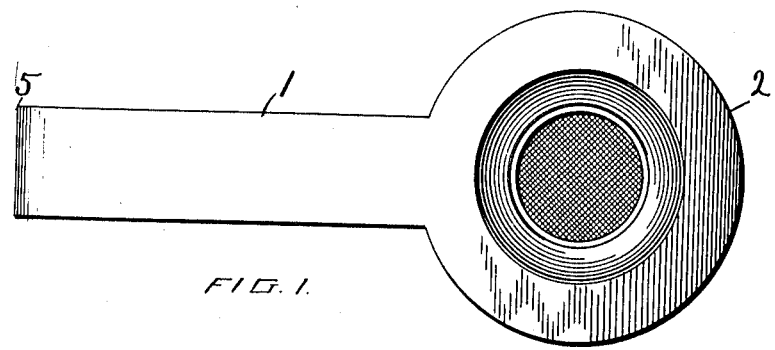
Figure 2:
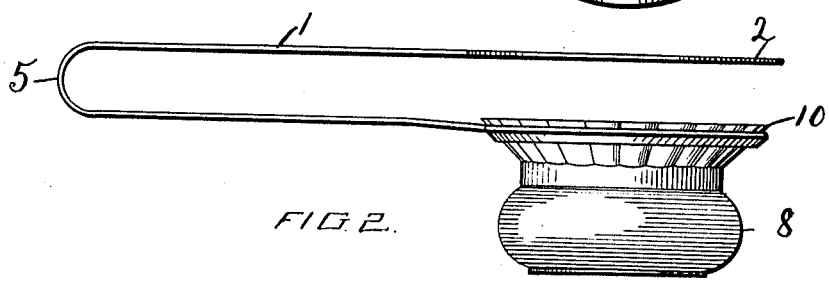
Figure 3:
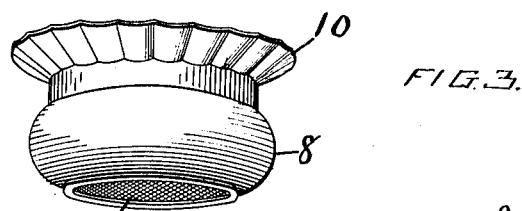
Figure 4:
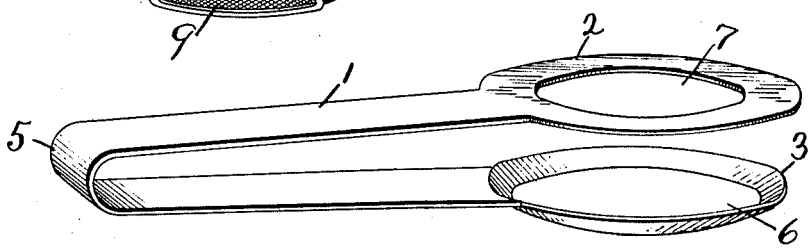

Referring to the drawings—Figure 1 is a top plan view of my improved device; Fig. 2 is a side view; Fig. 3 is a perspective view of the strainer; and Fig. 4 is a perspective view of the handle.

Referring now to the drawings, what I designate as the handle 1 is preferably stamped from sheet metal, the two ends 2 and 3 being enlarged, and the metal handle 1 bent in the center, as shown at 5. This forms a resilient handle comprising two arms which may be opened and closed by a slight pressure of the hand. In the ends 2 and 3 of the handle circular openings 6 and 7 are provided, and the rim of the end 3 is stamped downwardly, as clearly shown in Fig. 3.

The reference numeral 8 designates a strainer, which is provided with a screen 9 in the bottom thereof, and 10 designates a flaring rim or flange around the top thereof. The strainer is so constructed that the body portion will snugly fit within the opening 6 of the end 3 and be supported by the flange 10.

To assemble the article, the strainer 8 is simply passed within the opening 6 of the end 3, and may be easily and readily removed at any time to cleanse the same. If so desired the strainer may be permanently fastened within the opening 6 of the end 3 of the handle.

It will be readily understood that I do not wish to limit myself to the use of sheet metal, as the article may be made of other metal, or wire, and may be formed in different shapes.

It will be readily seen that with a device of this character eggs may be easily lifted from boiling water, and may be readily opened by passing a knife over the upper surface of the end 2, and the fingers of the operator do not at any time have to come in contact with the hot egg.

As a tea or coffee strainer, the article is used as an ordinary strainer.

Having thus described my invention, what I claim and desire to secure by Letters Patent is:

1. A piece of sheet metal formed with enlarged ends provided with openings therein, and a strainer adapted to fit within one of said openings, substantially as described.

2. A piece of sheet metal, bent to form two arms with enlarged ends provided with circular openings therein, and a strainer adapted to fit within one of said openings and removably supported therein.

3. A piece of sheet metal, bent to form two resilient arms with enlarged ends provided with circular openings therein, the rim of the opening of one of said arms bent downwardly, and a removable strainer provided with a flange adapted to be supported by said downwardly bent rim, substantially as described.

This specification signed and witnessed this 19th day of July A. D. 1911.

JOSEPHINE G. SHEPARD.

In the presence of—
FLORENCE T. SHEPARD,
ETTA L. PULSIFER.